(12) United States Patent
Huo et al.

(10) Patent No.: US 9,645,587 B2
(45) Date of Patent: May 9, 2017

(54) DRIVING APPARATUS AND VALVE INCLUDING THE SAME

(71) Applicant: EMERSON PROCESS MANAGEMENT REGULATOR TECHNOLOGIES, INC., McKinney, TX (US)

(72) Inventors: Ping Huo, Chengdu (CN); Yanwei Lei, Chengdu (CN); Zhong Yang, Chengdu (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/437,827

(22) PCT Filed: Oct. 22, 2013

(86) PCT No.: PCT/CN2013/085713
§ 371 (c)(1),
(2) Date: Apr. 22, 2015

(87) PCT Pub. No.: WO2014/063618
PCT Pub. Date: May 1, 2014

(65) Prior Publication Data
US 2015/0277451 A1    Oct. 1, 2015

(30) Foreign Application Priority Data

Oct. 22, 2012  (CN) .......................... 2012 2 0566015

(51) Int. Cl.
*F16K 31/12*   (2006.01)
*F16K 1/50*    (2006.01)
(Continued)

(52) U.S. Cl.
CPC ....... *G05D 16/103* (2013.01); *F16K 31/1264* (2013.01); *G05D 16/0655* (2013.01); *Y10T 137/7793* (2015.04)

(58) Field of Classification Search
CPC .............. G05D 16/103; G05D 16/0655; F16K 31/1264; Y10T 137/7793; Y10T 137/7762; Y10T 137/777
(Continued)

(56) References Cited

U.S. PATENT DOCUMENTS 3,159,388 A * 12/1964 Wall ................... G05D 16/0655
                                                    137/505.42
3,207,468 A *  9/1965 Lauducci .............. F15B 15/068
                                                    251/163

(Continued)

FOREIGN PATENT DOCUMENTS

CN        101737502 A    6/2010
CN        202469058 U   10/2012
(Continued)

OTHER PUBLICATIONS

International Preliminary Report on Patentability and Written Opinion for International Application No. PCT/CN2013/085713, dated May 7, 2015.

*Primary Examiner* — Craig Schneider
*Assistant Examiner* — Minh Le
(74) *Attorney, Agent, or Firm* — Marshall, Gerstein & Borun LLP

(57) ABSTRACT

A driving apparatus and a valve including the same. The driving apparatus senses a pressure of a fluid medium and generates a driving force. The driving apparatus includes: a drive shaft, a sensing device, a limiting device, a support body, and a protruding member. The limiting device includes a groove, and the protruding member is engaged in the groove. The limiting device can thus automatically limit (Continued)

the rotation of the drive shaft, so as to avoid damaging the sensing device, thereby facilitating maintenance and installation of the valve.

7 Claims, 4 Drawing Sheets

(51) Int. Cl.
    *G05D 16/10*         (2006.01)
    *F16K 31/126*      (2006.01)
    *G05D 16/06*         (2006.01)

(58) Field of Classification Search
    USPC ........... 137/505, 488, 492.5; 251/45, 58, 60, 251/63.4, 90, 92, 93, 102, 284, 286, 331, 251/366
    See application file for complete search history.

(56) References Cited

U.S. PATENT DOCUMENTS

| | | | |
|---|---|---|---|
| 3,602,478 A * | 8/1971 | Cairns | F16K 31/1655 251/285 |
| 3,838,987 A * | 10/1974 | Draut | F16D 1/02 29/426.2 |
| 4,014,514 A * | 3/1977 | Priese | F16K 7/16 251/285 |
| 4,193,337 A * | 3/1980 | Disdier | F01B 3/04 74/99 R |
| 4,325,535 A * | 4/1982 | Foster | F16H 25/2204 251/58 |
| 4,492,668 A * | 1/1985 | Pilgrim, Jr. | G21C 3/326 376/440 |
| 5,294,090 A * | 3/1994 | Winnike | F16K 47/00 251/36 |
| 5,329,959 A * | 7/1994 | Owen | F16K 35/06 137/315.17 |
| 6,603,229 B1 * | 8/2003 | Toye, IV | H02K 7/06 128/205.24 |
| 6,824,471 B2 * | 11/2004 | Kamenov | F04D 13/021 403/13 |
| 6,932,108 B2 * | 8/2005 | Hecking | G05D 16/0669 137/454.6 |
| 6,976,668 B2 * | 12/2005 | Weingarten | F16K 7/14 137/529 |
| 8,104,742 B2 * | 1/2012 | Ishihara | F16K 31/50 251/265 |
| 8,739,943 B2 * | 6/2014 | Hopson | F16D 55/36 188/264 D |
| 2002/0063230 A1 * | 5/2002 | Cavagna | F16K 1/523 251/284 |
| 2004/0061084 A1 * | 4/2004 | Baumann | F16K 3/0218 251/58 |
| 2014/0261785 A1 * | 9/2014 | Andersson | G05D 16/0658 137/505 |
| 2015/0240965 A1 * | 8/2015 | Arnold | F16K 31/163 251/58 |

FOREIGN PATENT DOCUMENTS

FR         GB 1285477 A *   8/1972  ............... F16B 3/00
JP          2011248512 A    12/2011

* cited by examiner

DRIVING APPARATUS AND VALVE INCLUDING THE SAME

TECHNICAL FIELD

The present disclosure relates to a driving apparatus and a valve including the same.

BACKGROUND ART

Currently, in a driving apparatus and a valve including the driving apparatus, such as an actuator and a regulating valve, for example, in a valve 1 shown in FIG. 1, generally a valve stem 11 and a valve core assembly 12 are connected together, the other end of the valve stem 11 is connected to a diaphragm 13 in the actuator, and the diaphragm 13 can sense a pressure of a fluid medium and then transmits the pressure to the valve core through the valve stem 11, thereby regulating the pressure. Generally, during maintenance or installation of the valve core assembly, if a nut 15 in the valve core assembly is screwed when a clamping surface 14 at the upper end of the valve stem is not clamped, the valve stem 11 drives the diaphragm 13 to rotate, and the diaphragm 13 may be damaged in the event the nut 15 is excessively screwed. Therefore, generally, the clamping surface 14 at the upper end of the valve stem 11 needs to be clamped in order to install or remove the valve core assembly 12. However, to clamp the upper end of the valve stem 11, a spring cartridge 16 needs to be removed. Such a design makes it difficult to install and maintain the valve 1.

BRIEF SUMMARY

The present disclosure provides a driving apparatus and a valve including the same, which can limit the rotation of the drive shaft, so as to protect the sensing device from being damaged.

In accordance with a first exemplary aspect of the invention, a driving apparatus is provided. The driving apparatus senses a pressure of a medium and generates a driving force, and includes a drive shaft, a sensing device, a limiting device, and a support body. The drive shaft extends through the sensing device, the limiting device and the support body. One end of the drive shaft is connected to the sensing device. One of the limiting device and the support body is provided with a groove, and the other of the limiting device and the support body is provided with a protruding member engaged in the groove.

In one preferred form of the driving apparatus, the limiting device is a cylinder with a central hole, and the groove on the limiting device is an arc groove extending inward along an outer surface of the cylinder.

In another preferred form of the driving apparatus, the limiting device includes a plurality of arc grooves evenly distributed on the limiting device.

In another preferred form of the driving apparatus, the limiting device further includes a positioning key, a first key groove is formed in the drive shaft, and a second key groove is formed in an inner wall of the cylinder of the limiting device. The positioning key can be located in the first key groove and the second key groove at the same time.

In another preferred form of the driving apparatus, the drive shaft is a stepped shaft and has a stepped portion, the inner wall of the limiting device is further provided with a projecting portion supported by the step of the drive shaft. The projecting portion includes the second key groove.

In another preferred form of the driving apparatus, the groove is in clearance fit with the protruding member.

In accordance with a second exemplary aspect of the invention, a valve is provided that includes a valve core assembly and a valve body. The valve core assembly is arranged in the valve body. The valve also includes a driving apparatus in accordance with the foregoing first exemplary aspect. The protruding member can be used to connect the driving apparatus and the valve body.

In accordance with a third exemplary aspect of the invention, a valve is provided that includes a valve body, a limiting device, and a drive shaft arranged in the valve body. The limiting device is sleeved on the drive shaft. One of the limiting device and the valve body includes a groove, and the other of the limiting device and the valve body includes protruding member arranged in the groove.

In one preferred form of the valve, the limiting device is a cylinder with a central hole, and the groove on the limiting device is an arc groove extending inward along an outer surface of the cylinder.

In another preferred form of the valve, the valve is a pressure regulating valve, a back pressure valve, or a control valve.

According to the driving apparatus and the valve including the same constructed according to the present invention, a limiting device with a groove is provided in the driving apparatus or on the drive shaft in the valve body of the valve, and the groove of the limiting device is mated with the protruding member, so that during installation and maintenance of the valve core assembly, the spring cartridge does not need to be removed to clamp the clamping surface at the upper end of the drive shaft, and the drive shaft can be prevented from rotating excessively to drive the connected sensing device to rotate, thereby preventing damage to the sensing device. Such a design greatly facilitates maintenance and installation of the valve.

DETAILED DESCRIPTION OF THE DRAWINGS

Figure 1:
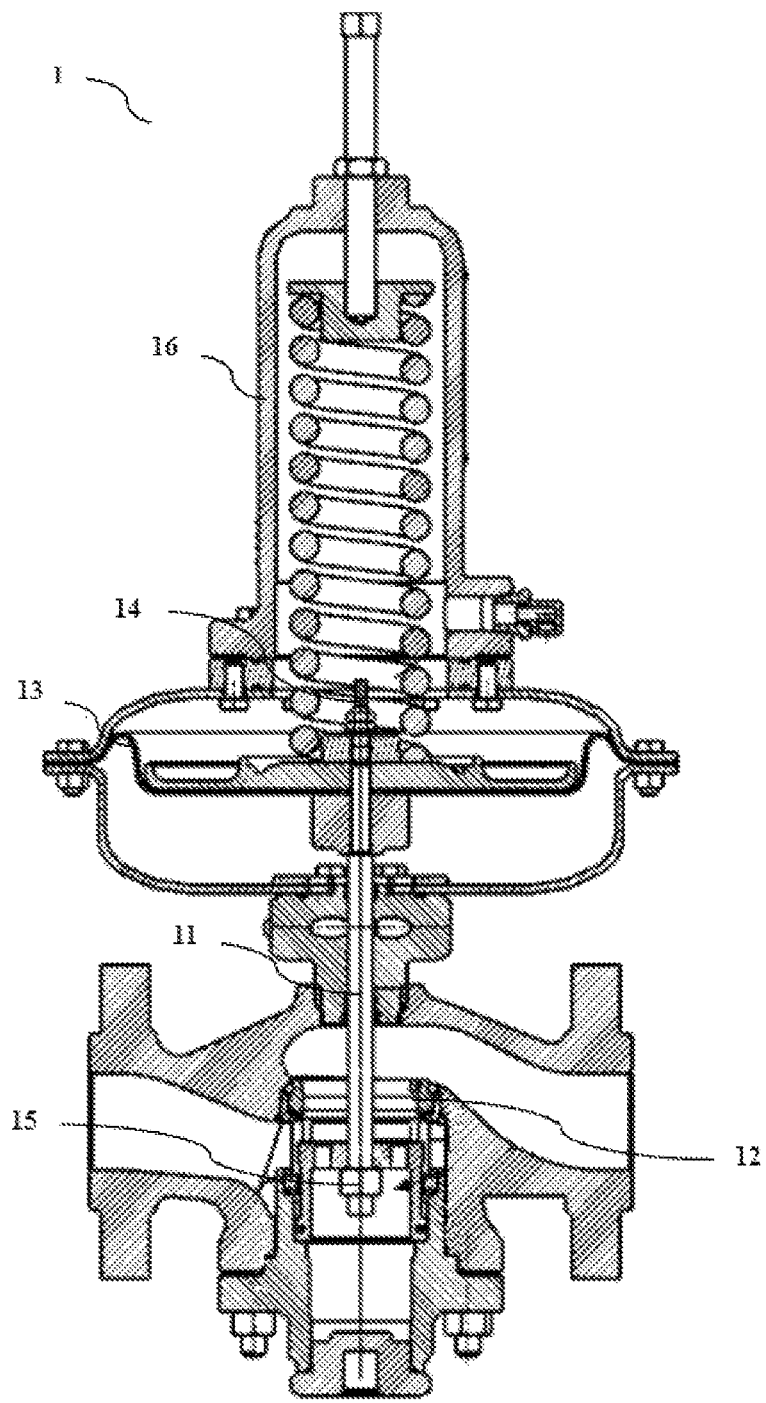
FIG. 1 is a schematic view of a known valve.

The technical solutions of the present invention are described in further detail below with reference to the accompanying drawings and specific embodiments.

EXAMPLE 1

According to one aspect of the present invention, a driving apparatus 2, which can sense a pressure of a medium and generate a driving force, is provided. The driving apparatus 2 includes a drive shaft 21, a sensing device 22, a limiting device 23, and a support body 24. The drive shaft 21 extends through the sensing device 22, the limiting device 23, and the support body 24. The limiting device 23 is supported by the support body 24, and the support body 24 may be a housing that forms a sensing cavity of the driving apparatus, or may be a valve body or an upper valve cover. Correspondingly, the limiting device 23 may be located in the sensing cavity inside the driving apparatus, or located on the valve body outside the driving apparatus.

Figure 2:
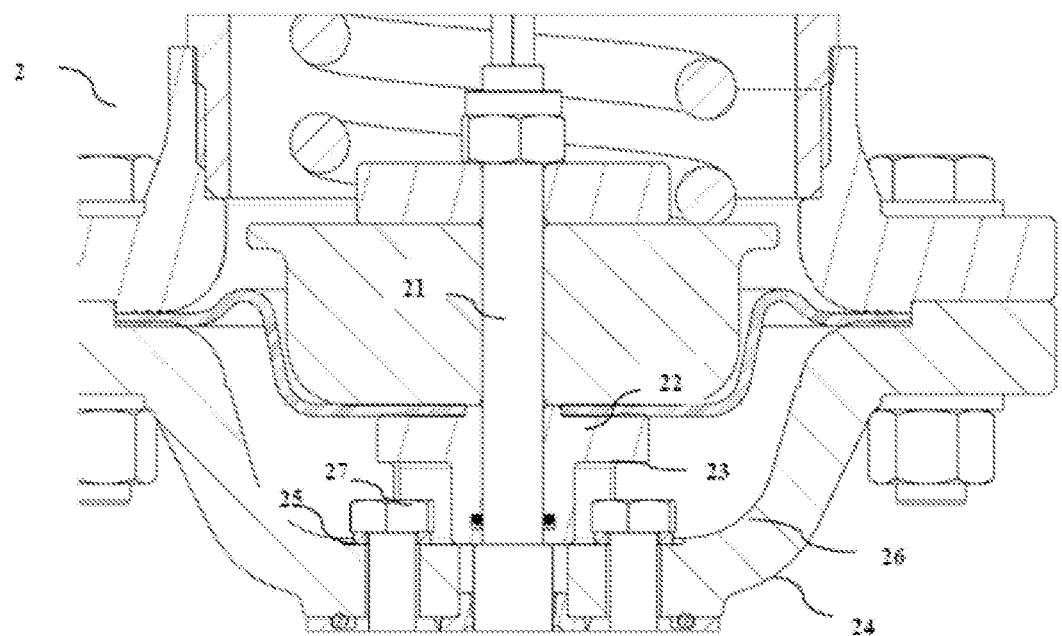
FIG. 2 is a close-up view of one example of a driving apparatus constructed in accordance with the teachings of the present invention.

Preferably, as shown in FIG. 2, the sensing device 22 and the support body 24 forms an enclosed cavity 26, the limiting device 23 is located in the enclosed cavity 26, and one end of the drive shaft 21 is connected to the sensing device 23. The sensing device 22 is used to sense the pressure of the working medium in the driving apparatus, and drives the drive shaft 23 to move depending on the pressure, thereby completing the driving operation.

In one aspect, the limiting device 23 is a cylinder with a central hole, a groove 27 extends inward along an outer surface of the cylinder, and the limiting device 23 is sleeved on the drive shaft 21 and located below the sensing device 22, the support body 24 is provided with a protruding member 25, and the protruding member 25 is engaged in the groove 27 with clearance fit. Therefore, when the drive shaft 21 receives a rotating force, the protruding member 25 on the support body 24 can limit the rotation of the limiting device 23, and thus limit the amount of rotation of the drive shaft 21, to avoid damaging the sensing device 22 connected to the drive shaft 21 caused by rotation. The sensing device 22 may specifically be a diaphragm. The limiting device 23 can protect the diaphragm from being damaged.

In addition, the support body 24 of the driving apparatus 2 in this example is further provided with a protruding connecting component for connecting the driving apparatus 2 and other devices mated with the driving apparatus. Therefore, the connecting component may be used as the protruding member to mate with the groove 27 of the limiting device 23, so as to limit the rotation of the drive shaft 21, thereby preventing damage to the sensing device 22. Specifically, the connecting component may be a screw, a pin or the like.

In addition, the limiting device 23 may include more than one groove. The protruding member may be correspondingly mated in the groove, and maintain a clearance fit with the groove. Preferably, the groove is an arc groove extending inward along the outer surface of the cylinder. In one example, the limiting device includes four arc grooves evenly distributed on the limiting device.

Figure 3:
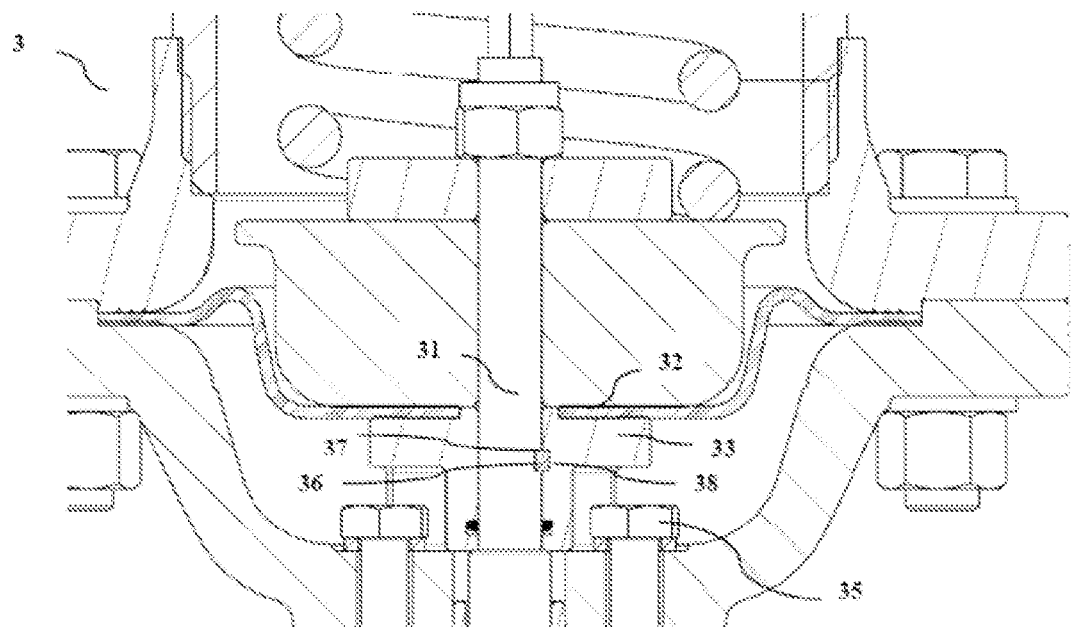
FIG. 3 is a close-up view of another example of a driving apparatus constructed according to the teachings of the present invention.

Further, because the limiting device 23 is sleeved on the drive shaft 21, an inner wall of the central hole of the limiting device may further be provided with a positioning key. Specifically, in a driving apparatus 3 shown in FIG. 3, the limiting device 33 of the driving apparatus 3 includes a positioning key 36 mated between a first key groove 37 formed in the drive shaft 31 and a second key groove 38 formed in an inner wall of the limiting device 33. In this way, when receiving a rotating force, the drive shaft 31 can transmit the rotating force to the limiting device 33 through the positioning key 36, and the limiting device 33 can rotate, but only slightly so before being limited by the protruding member 35 mated with the groove of the limiting device, preventing damage to the sensing device 32. Because the drive shaft 31 is coupled to the limiting device 33 by using a pin or key, such a rigid coupling also limits the drive shaft 31, and can prevent the drive shaft from rotating even when there is an external rotating force, thereby ensuring that the sensing device will not be damaged.

Figure 4:
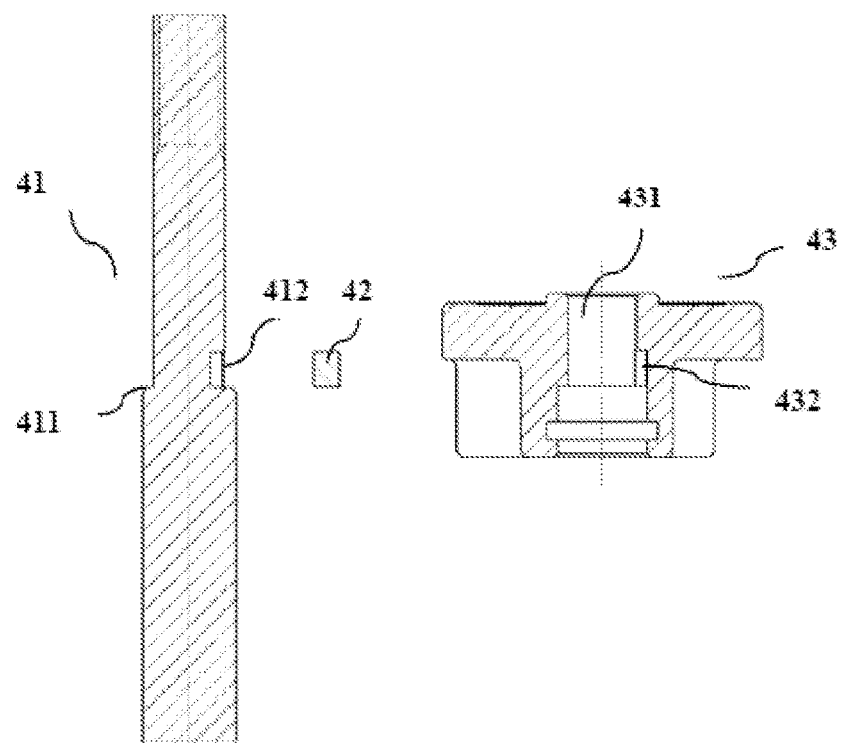
FIG. 4 depicts examples of a drive shaft and a limiting device constructed according to the teachings of the present invention.
Figure 5:
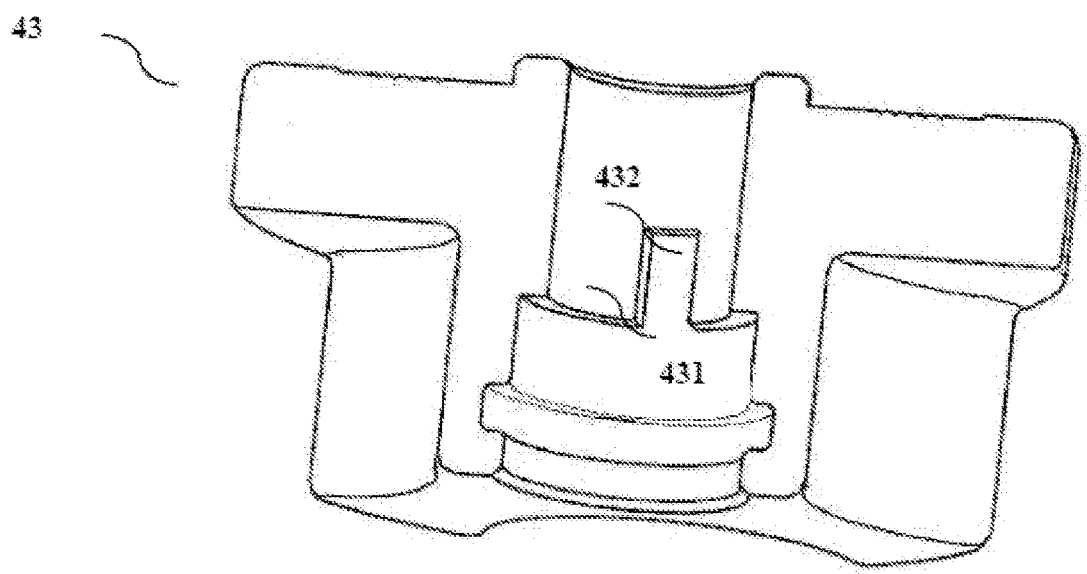
FIG. 5 is a close-up view of the limiting device of FIG. 4.

Optionally, FIG. 4 is a sectional view of a drive shaft and a limiting device. The drive shaft 41 is a stepped shaft and has a step 411, and the drive shaft 41 is further provided with a first key groove 412. Referring to FIG. 5, the inner wall of the central hole of the limiting device 43 is provided with a projecting portion 431 having a second key groove 432, and the positioning key 42 is mated in the first key groove 412 and the second key groove 432 at the same time. The step 411 of the drive shaft 41 is mated with the projecting portion 431 of the limiting device 43, so that the limiting device is supported by the step of the drive shaft.

Optionally, the inner wall of the limiting device may also be provided with an annular groove for receiving an elastic element such as an O-ring, so as to provide a sealing effect.

In another aspect, the limiting device is sleeved on the drive shaft and located below the sensing device, the limiting device is provided with a protruding member, the support body is provided with a groove, and the protruding member is in clearance fit with the groove. Thus, when the drive shaft receives a rotating force, because the protruding member of the limiting device is engaged in the groove of the support body, the rotation of the drive shaft can be limited, preventing damage to the sensing device connected to the drive shaft caused by rotation.

EXAMPLE 2

Figure 6:
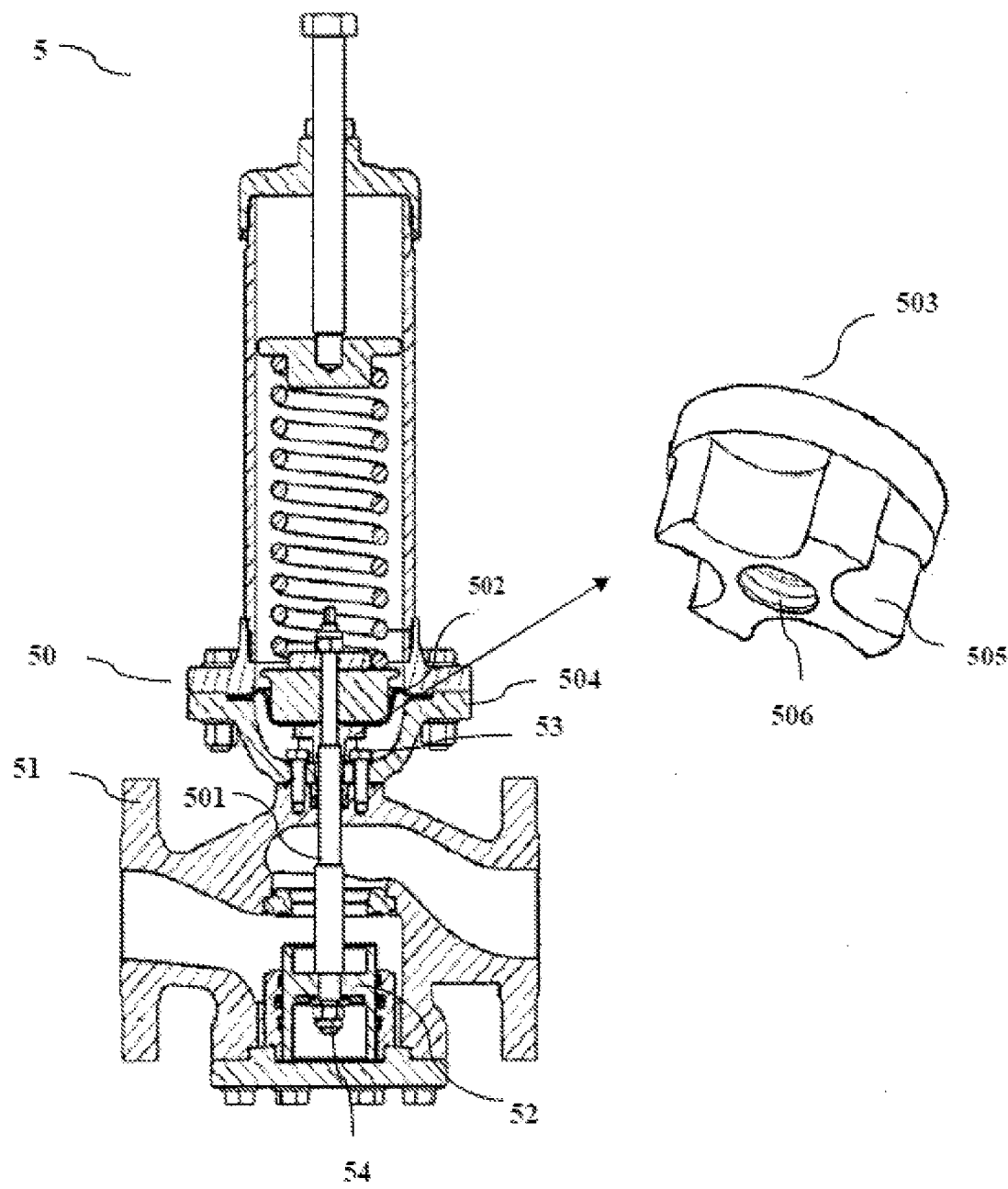
FIG. 6 depicts one example of a valve constructed according to the teachings of the present invention.

According to another aspect of the present invention, a valve 5 is provided. The valve 5 may include any one of the driving apparatuses described in Example 1. Preferably, as shown in FIG. 6, the valve includes a driving apparatus 50, a valve body 51, a valve core assembly 52, and a connecting component 53. The connecting component 53 is used for connecting the driving apparatus 50 and the valve body 51. The driving apparatus 50 includes a drive shaft 501, a sensing device 502, a limiting device 503, and a support body 504. The drive shaft 501 has a first end and a second end, the first end being connected to the sensing device 502, and the second end being connected to the valve core assembly 52. The valve core assembly 52 is arranged in the valve body 51, and the limiting device 503 is sleeved on the drive shaft 501. Specifically, the limiting device 503 is provided with a groove 505 and has a central hole 506, and the drive shaft 501 extends through the central hole 506 of the limiting device, so that the limiting device is sleeved on the drive shaft. The limiting device may be located in a sensing cavity of the driving apparatus 50, the sensing cavity being formed by the sensing device 502 and the support body 504, and the connecting component 53 on the support body protrudes from the support body; therefore, the connecting component 53 can be mated in the groove of the limiting device to limit the rotation of the drive shaft. Specifically, as shown in FIG. 6, the limiting device 503 is sleeved on the drive shaft 501 and located above the support body 504 of the driving apparatus 50, the support body is further provided with a connecting component 53 (e.g., a screw or a pin) for connecting the driving apparatus 50 and the valve body 51. The connecting component 53 is mated with the groove 505 of the limiting device, so that the drive shaft 501 does not significantly rotate, preventing damage to the sensing device 502.

During maintenance and installation of the valve 5, a fastener 54 of the second end of the drive shaft needs to be rotated and driven to remove the valve core assembly; however, when the fastener 54 is rotated, the drive shaft is driven to rotate along with the fastener 54. Because the first end of the drive shaft is connected to the sensing device 502, the rotation of the drive shaft drives the sensing device to rotate, but excessive rotation of the drive shaft may cause damage to the sensing device. Because the valve is provided with the limiting device 503, and the limiting device 503 is mated with the connecting component 53 to limit the rotation of the drive shaft, damage to the sensing device is thus prevented. The sensing device may be a diaphragm, but is not limited thereto.

Optionally, the inner wall of the central hole 506 of the limiting device may further be provided with threads, and the limiting device can be fixedly screwed onto the drive shaft by means of the threads.

As an Example 1, the limiting device may include more than one groove. The connecting component 53 may be correspondingly mated in the groove 505, and maintain a clearance fit with the groove. Preferably, the groove 505 is an arc groove extending inward along the outer surface of the cylinder. In one example, the limiting device includes four arc grooves evenly distributed on the limiting device.

As an Example 1, the inner wall of the central hole of the limiting device may also be provided with an annular groove for receiving an elastic element such as an O-ring, so as to provide a sealing effect.

EXAMPLE 3

According to another aspect of the present invention, a variant of the valve of Example 2 is provided. In this valve, the limiting device can be sleeved at other positions on the drive shaft, which can also prevent axial rotation of the drive shaft, protecting the sensing device from being damaged;

Specifically, the valve includes a valve body, a limiting device, and a drive shaft partially located in the valve body. The limiting device is sleeved on the drive shaft. The limiting device is provided with a groove, the valve body is provided with a protruding member, and the protruding member is mated in the groove of the limiting device.

Further, the limiting device can include more than groove. The protruding member may be correspondingly mated in the groove, and maintain a clearance fit with the groove. Preferably, the limiting device is a cylinder with a central hole, and the groove on the limiting device may be an arc groove extending inward along an outer surface of the cylinder. In one example, the limiting device can include four arc grooves evenly distributed on the limiting device.

The valve may specifically be a pressure regulating valve, a back pressure valve, or a control valve, but is not limited thereto.

It should be noted that as used herein, the terms "comprises", "comprising" or any other variation thereof, are intended to cover a non-exclusive inclusion, such that a process, method, article, or apparatus that comprises a list of elements does not include only those elements but may include other elements not expressly listed or inherent to such a process, method, article, or apparatus. An element proceeded by "a", "an", or the like does not, without more constraints, preclude the existence of additional identical elements in the process, method, article, or apparatus that comprises the element.

The above descriptions are merely preferred examples of the present invention, and are not intended to limit the protection scope of the present invention. Any modifications, equivalent replacements, or improvements made within the spirit and principle of the present invention shall be encompassed in the protection scope of the present invention.

The invention claimed is:

1. A driving apparatus for sensing a pressure of a medium and generating a driving force, the driving apparatus comprising:
   a drive shaft;
   a sensing device;
   a support body;
   an enclosed cavity formed by the sensing device and the support body; and
   a limiting device located in the enclosed cavity and sleeved on the drive shaft, the limiting device having a first portion and a second portion extending axially from the first portion, the second portion having an outer diameter that is less than an outer diameter of the first portion;
   wherein the drive shaft extends through the sensing device, the limiting device and the support body, and one end of the drive shaft is connected to the sensing device;
   wherein the limiting device includes a groove formed in the second portion, and the support body includes a protruding member engaged in the groove, so as to limit rotation of the sensing device.

2. The driving apparatus according to claim 1, wherein the groove is an arc groove extending inward along an outer surface of the second portion.

3. The driving apparatus according to claim 2, wherein the limiting device comprises a plurality of arc grooves evenly distributed on the limiting device.

4. The driving apparatus according to claim 2, wherein the limiting device further comprises a positioning key, wherein a first key groove is formed in the drive shaft, a second key groove is formed in an inner wall of the limiting device, and wherein the positioning key is located in the first key groove and the second key groove at the same time.

5. The driving apparatus according to claim 4, wherein the drive shaft is a stepped shaft and has a stepped portion, the inner wall of the limiting device includes a projecting portion, the projecting portion of the limiting device is supported by the stepped portion of the drive shaft, and the projecting portion includes the second key groove.

6. The driving apparatus according to claim 1, wherein the groove is in clearance fit with the protruding member.

7. A valve, comprising:
   a valve body;
   a valve core assembly arranged in the valve body; and
   a driving apparatus for sensing a pressure of a medium and generating a driving force applied to the valve core assembly, the driving apparatus comprising:
   a sensing device;
   a support body;
   an enclosed cavity formed by the sensing device and the support body;
   a limiting device located in the enclosed cavity, the limiting device having a first portion and a second portion extending axially from the first portion, the second potion having an outer diameter that is less than an outer diameter of the first portion; and
   a drive shaft having one end connected to the valve core assembly and another end connected to the sensing device, the drive shaft extending through the sensing device, the limiting device, and the support body,
   wherein the limiting device includes a groove formed in the second portion and the support body includes a protruding member engaged in the groove, so as to limit rotation of the sensing device, and wherein the protruding member connects the driving apparatus and the valve body.

* * * * *

UNITED STATES PATENT AND TRADEMARK OFFICE
CERTIFICATE OF CORRECTION

PATENT NO. : 9,645,587 B2
APPLICATION NO. : 14/437827
DATED : May 9, 2017
INVENTOR(S) : Ping Huo et al.

It is certified that error appears in the above-identified patent and that said Letters Patent is hereby corrected as shown below:

In the Specification

At Column 3, Lines 12-13, "sensing device 23." should be -- sensing device 22. --.

At Column 3, Line 15, "drive shaft 23" should be -- drive shaft 21 --.

At Column 5, Line 32, "damaged;" should be -- damaged. --.

Signed and Sealed this
Tenth Day of July, 2018

Andrei Iancu
*Director of the United States Patent and Trademark Office*